United States Patent
McKenzie et al.

(10) Patent No.: US 9,621,988 B2
(45) Date of Patent: Apr. 11, 2017

(54) DISC DRIVE SPEAKER VIBRATION MITIGATION

(71) Applicant: Seagate Technology LLC, Cupertino, CA (US)

(72) Inventors: Lealon R. McKenzie, Shakopee, MN (US); Evgeny Kharisov, Chaska, MN (US); Zai Yu Nang, Singapore (SG); Qiang Bi, Singapore (SG); Seow Zhao Li, Singapore (SG); Raye A. Sosseh, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 21 days.

(21) Appl. No.: 14/109,687

(22) Filed: Dec. 17, 2013

(65) Prior Publication Data

US 2015/0172810 A1    Jun. 18, 2015

(51) Int. Cl.
*G11B 5/55* (2006.01)
*H04R 3/00* (2006.01)
*G11B 5/596* (2006.01)
*H04R 15/00* (2006.01)
*H04R 29/00* (2006.01)

(52) U.S. Cl.
CPC ........... *H04R 3/002* (2013.01); *G11B 5/5582* (2013.01); *G11B 5/59694* (2013.01); *H04R 15/00* (2013.01); *H04R 29/001* (2013.01)

(58) Field of Classification Search
None
See application file for complete search history.

(56) References Cited

U.S. PATENT DOCUMENTS

| | | | |
|---|---|---|---|
| 5,901,009 A | 5/1999 | Sri-Jayantha et al. | |
| 7,139,401 B2 * | 11/2006 | Culman et al. | 381/71.7 |
| 7,372,654 B2 * | 5/2008 | Fujie | G10K 11/1788 360/137 |
| 7,375,916 B2 | 5/2008 | Semba et al. | |
| 7,586,711 B2 * | 9/2009 | Knigge et al. | 360/75 |
| 7,768,738 B2 | 8/2010 | Abramovitch et al. | |
| 7,852,588 B1 | 12/2010 | Ferris et al. | |
| 8,405,927 B2 * | 3/2013 | Che et al. | 360/75 |
| 8,577,070 B2 | 11/2013 | Yu | |
| 8,634,158 B1 * | 1/2014 | Chahwan | G11B 5/5582 360/75 |
| 8,737,012 B2 * | 5/2014 | Otani | G11B 33/08 360/78.04 |
| 9,013,825 B1 * | 4/2015 | Chahwan | G11B 5/59694 360/75 |
| 2007/0268618 A1 | 11/2007 | Liu et al. | |

* cited by examiner

*Primary Examiner* — K. Wong
(74) *Attorney, Agent, or Firm* — Crawford Maunu PLLC (57) ABSTRACT

Certain exemplary aspects of the present disclosure are directed towards apparatuses and methods which mitigate the effect of speaker vibration on a disc drive. Audio associated with a speaker output is detected and triggers the generation of an output signal indicative of speaker vibration associated with such an audio output of a speaker. A magnetoresistive transducer of the disc drive is positioned relative to a storage medium based on the output signal, a target data storage location in the storage medium from which data is to be accessed via the positioning, and the position of the transducer. The output signal mitigates the effect of the speaker vibration on the transducer.

20 Claims, 6 Drawing Sheets

DISC DRIVE SPEAKER VIBRATION MITIGATION

SUMMARY

Various example embodiments are directed to apparatuses and/or methods that facilitate the mitigation of speaker vibration on a disc drive and its magnetoresistive transducer. Speaker vibration can prevent the magnetoresistive transducer from maintaining its proper position at a data track center, reduce read/write performance of the transducer, and in some cases result in failure of the disc drive. A speaker vibration modeling circuit can be used to mitigate vibrational effects on the magnetoresistive transducer related to such speaker vibration, by detecting speaker audio and positioning the transducer to correct for the speaker vibrations. Certain embodiments mitigate speaker vibration by detecting the audio to be played through the speaker prior to such audio transmission. In other embodiments, a microphone is used to detect an audio output of a speaker, and the audio output is used to mitigate vibration. Such embodiments are implemented to correct for the full vibration spectrum of an audio speaker.

According to an embodiment of the present disclosure, an apparatus includes a hard disc drive, a speaker vibration modeling circuit, and a feedback circuit. The disc drive includes a storage medium and a magnetoresistive transducer to access (read/write) data storage locations on the storage medium. The speaker vibration modeling circuit detects an audio signal and generates an output signal indicative of modeled speaker vibration corresponding to the detected audio signal. A feedback circuit then positions the magnetoresistive transducer of the disc drive relative to the storage medium based upon a target data storage location (from which data is to be accessed), the position of the magnetoresistive transducer, and the modeled speaker vibration output signal.

In a particular embodiment, a disc drive including a speaker vibration modeling circuit monitors an audio input (e.g., an input audio signal or sound waves), the audio input's frequency, and the effect of speaker-induced vibrations on a magnetoresistive transducer associated with the monitored audio input frequency. The speaker vibration modeling circuit calculates an output signal that mitigates the effect of the speaker vibration, associated with the audio input, on the magnetoresistive transducer.

Various example embodiments are directed to methods and/or apparatuses that employ a lookup table associating audio input frequencies with the effect of speaker vibration associated with the audio input frequency. A speaker vibration modeling circuit then calculates, based on a known effect of the speaker vibration associated with the audio input frequency as depicted via the lookup table, an output signal to mitigate the speaker vibration effect on a magnetoresistive transducer of a disc drive.

Consistent with further embodiments, a magnetoresistive transducer of a disc drive is positioned over a storage medium as follows. A position error signal and a feedforward signal, are provided (e.g., generated) and summed to produce a modified position error signal that mitigates the effect of speaker vibrations on the positioning of the magnetoresistive transducer. The position error signal is based on a position error of the magnetoresistive transducer, and a target position of the transducer compared to the actual position of the transducer. The feedforward signal is generated as follows. First, a speaker vibration modeling circuit, communicatively coupled to an audio input of an audio speaker, senses the audio input frequency of the audio. The sensed audio input and its frequency is associated with a corresponding speaker vibration, and the feedforward signal is determined as a signal that will cancel the effect of the speaker vibration on the transducer. The feedforward signal is then output from the speaker vibration modeling circuit and summed with the position error signal to generate a modified position error signal that mitigates the speaker vibration effects on the positioning of the magnetoresistive transducer.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present invention are believed to be applicable to a variety of different types of devices, systems and arrangements involving the mitigation of speaker-induced vibration in electro-mechanical systems. Specific embodiments are believed to be particularly beneficial to disc drives. While the present invention is not necessarily so limited, various aspects of the invention may be appreciated through a discussion of examples using this context.

Various example embodiments are directed to apparatuses and/or methods that facilitate the mitigation of speaker vibration on a disc drive and its magnetoresistive transducer. Speaker vibration is particularly detrimental to the operation of a disc drive when the speaker and disc drive are mechanically coupled to one another, such as in laptop and tower computers. In some cases, speaker vibration can prevent the magnetoresistive transducer in a disc drive from maintaining its proper position at a data track center. Moreover, speaker vibration over a period of time can result in reduced read/write performance of the disc drive. In some cases, speaker vibration can cause permanent loss of data due to unintentional data overwrites, where a write operation is in progress and speaker vibration undesirably drives the transducer off a target track and onto an adjacent track containing data. A speaker vibration modeling circuit is used to mitigate the vibrational effects on the magnetoresistive transducer related to such speaker vibration by detecting speaker audio and positioning the transducer to correct for the associated speaker vibrations. Certain embodiments mitigate speaker vibration by detecting the audio to be played through the speaker prior to such audio transmission, and using the detected audio to mitigate effects of speaker vibration on the transducer upon playback of the audio. In other embodiments, a microphone detects an audio output of the speaker (e.g., sound waves), which are similarly used to mitigate the effects of expected speaker vibrations corresponding to the audio output. In some implementations, such embodiments (and as disclosed in more detail below) are implemented to correct for the full vibration spectrum of a speaker, and are accordingly not susceptible to "blind spots" in the frequency spectrum of a computer speaker which could otherwise result in uncorrectable vibration frequency ranges.

In a particular embodiment, an apparatus includes a hard disc drive, a speaker vibration modeling circuit, and a feedback circuit. The disc drive includes a storage medium and a magnetoresistive transducer to access (read/write) data storage locations on the storage medium. The speaker vibration modeling circuit detects an audio signal and generates an output signal indicative of modeled speaker vibration corresponding to the detected audio signal. A feedback circuit then positions the magnetoresistive transducer of the disc drive relative to the storage medium based upon a target data storage location from which data is to be accessed, the position of the magnetoresistive transducer, and the modeled speaker vibration indicated via the output signal. In some embodiments, the disc drive is coupled to a computer including audio speakers, and the speaker vibration modeling circuit mitigates the effects of speaker-induced vibrations on the magnetoresistive transducer. In some more detailed embodiments, the speaker vibration modeling circuit detects audio by detecting an electronic audio signal including audio playback data for generating sound via a speaker for which the speaker vibration is modeled. In other embodiments, the speaker vibration modeling circuit detects audio by detecting sound waves generated by a speaker. The detected audio can be an analog or digital audio signal, as well as electronic data packets consisting of audio-based data content.

In conjunction with one or more such embodiments, the output signal of the speaker vibration modeling circuit is based upon an expected effect of a speaker's vibration on the transducer. In other embodiments, the output signal is based on a lookup table containing audio inputs and a corresponding speaker vibration on the magnetoresistive transducer associated with the audio input. A speaker vibration modeling circuit can then use the effect of the speaker vibration associated with the audio input frequency to calculate an output signal to mitigate the speaker vibration effect on a magnetoresistive transducer of a disc drive.

In some more specific embodiments, the detected audio is communicated to a speaker vibration modeling circuit that is within the hard disc drive, via an enhanced hard disc drive connector that communicates both data and audio signals, to the disc drive. For instance, read and write data may be communicated via such an enhanced connector, along with audio for the vibration modeling. Such an enhanced connector may, for example, be used to facilitate the additional communication of audio signals useful in mitigating vibration.

In other specific embodiments, an analog speaker signal is provided to a speaker vibration modeling circuit via a microphone, and the speaker vibration modeling circuit uses the analog speaker signal produced by the microphone to mitigate effects of speaker-induced vibrations on the magnetoresistive transducer. For example the microphone can be used to detect sound waves corresponding to audio played via the speaker, and the related analog speaker signal can be used to estimate and reduce/eliminate an effect of vibration associated with the sound waves upon the magnetoresistive transducer. In some embodiments, an on-board computer microphone (e.g., as may be used for capturing a user's voice) is utilized to detect the sound. In such embodiments, the speaker vibration modeling circuit accesses audio data collected via the microphone, such as by accessing operating system programming within the computer and associated with the microphone and related audio processing. In other embodiments, the microphone is mechanically coupled to the disc drive and implemented specifically for detecting sound waves or mechanical vibrations present at the disc drive.

In a method-based embodiment, audio associated with a speaker output is detected and used to generate an output signal that is indicative of modeled speaker vibration corresponding to the detected output. A hard disc drive magnetoresistive transducer is positioned relative to a storage medium, based on each of: a target data storage location to be accessed, a current position of the magnetoresistive transducer, and the modeled speaker vibration indicated via the output signal.

In some more detailed embodiments, a magnetoresistive transducer is positioned by adjusting a feedforward signal to cancel speaker vibration, summing the feedforward signal with a position error signal, and providing an amplified version of the position error signal including the feedforward signal. The feedforward signal is adjusted to cancel speaker vibrations using a received audio signal that is associated with an output of the audio speaker to model speaker vibration corresponding to the received audio signal. The audio signal may, for example, originate from a digital speaker signal, an analog speaker signal, and an analog microphone signal. The feedforward signal is summed with the position error signal for an actuator (e.g., a voice coil motor, and/or a piezoelectric actuator) that positions the magnetoresistive transducer. An amplified version of the position error signal including the summed feedforward signal is provided to the actuator. The position error signal is used to determine a force to be applied to the actuator to hold the magnetoresistive transducer at a target track center position while vibrations, associated with the audio speaker, occur.

In some embodiments, the feedforward signal is generated by associating the received audio signal with a corresponding vibration sensed at a transducer of the hard disc drive, via a lookup table. The feedforward signal is generated to mitigate off-track effects of such vibration on the transducer. In yet other embodiments, the feedforward signal is of an inverse amplitude of vibration associated with the audio signal, and the position error signal applied to the actuator provides an equal and opposite force to the vibrations.

Consistent with further embodiments, a magnetoresistive transducer of a disc drive is positioned on a storage medium by providing a position error signal, generating a feedforward signal, and summing the two signals to produce a modified position error signal that mitigates the speaker vibrations effect on the positioning of the magnetoresistive transducer. The position error signal is based on a comparison of a target position of the transducer with an actual position of the transducer. A speaker vibration modeling circuit, coupled to an audio input of an audio speaker, senses the audio input frequency of the audio. The audio input can originate from a digital speaker signal, an analog speaker signal, and an analog microphone signal, among others. The frequency of the sensed audio input is associated with a corresponding speaker vibration, and a feedforward signal is generated to cancel the effect of the associated speaker vibration on the transducer. The feedforward signal is then output from the speaker vibration modeling circuit and summed with the position error signal to generate the modified position error signal that mitigates the speaker vibrations effect on the positioning of the magnetoresistive transducer. In more detailed embodiments, the effect of the speaker vibration on the disc drive is learned for a plurality of audio inputs, and the learned effects are stored in a lookup table on the disc drive in association with the respective audio inputs. One of the learned effects of the speaker vibration that corresponds to the sensed audio input is retrieved from the lookup table and used to generate a feedforward signal with a frequency that is phase-offset from the speaker vibration and amplitude that inversely corresponds to the retrieved learned effects of the speaker vibration.

Figure 1:
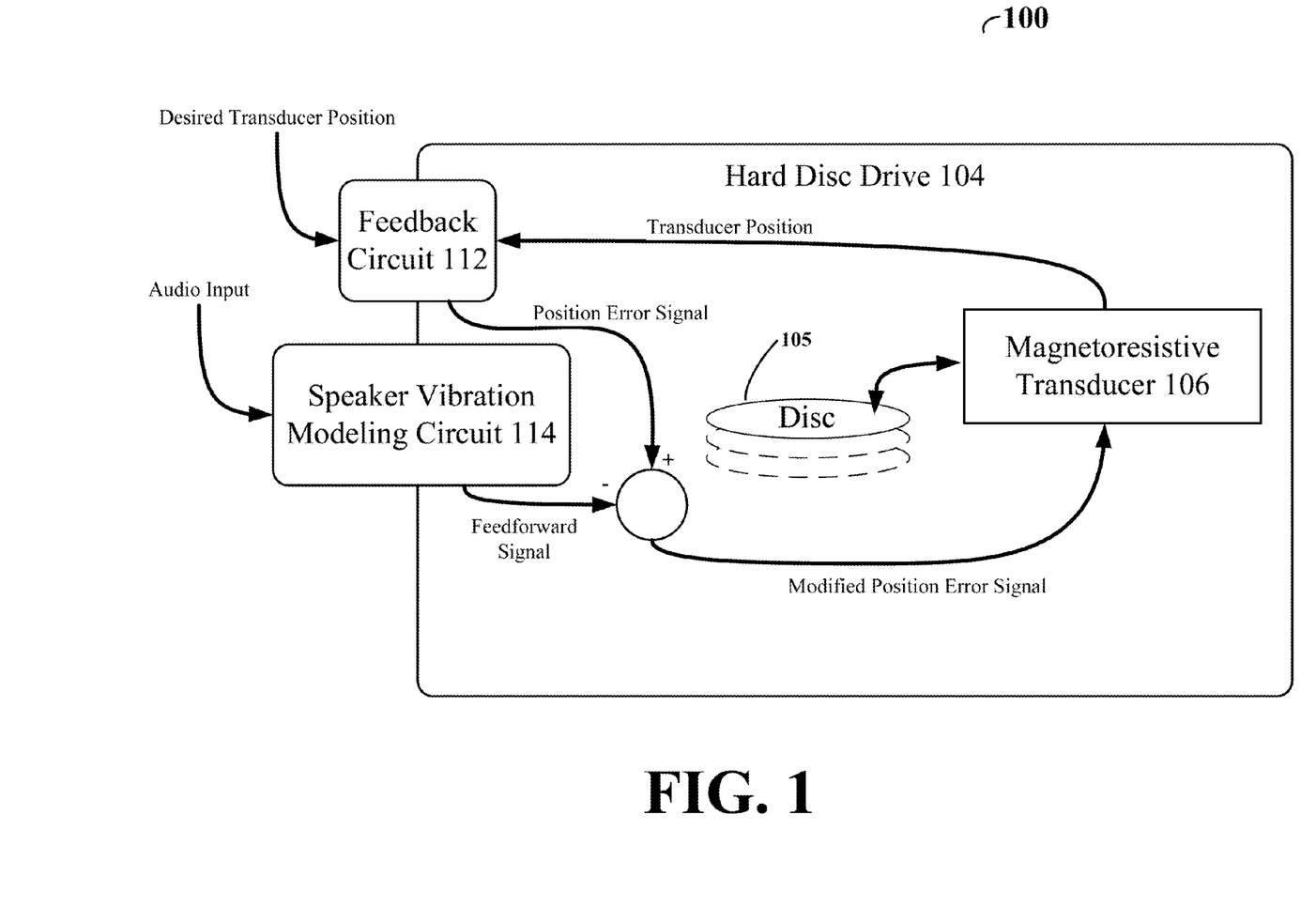
FIG. 1 is a block diagram of a disc drive environment consistent with various aspects of the present disclosure.

Turning now to the figures, FIG. 1 illustrates a block diagram of a computer system 100 including a hard disc drive 104, a feedback circuit 112, and a speaker vibration modeling circuit 114. One or both of the feedback circuit 112 and the speaker vibration modeling circuit 114 can be within the disc drive, or, in the alternative can be external to the disc drive. A magnetoresistive transducer 106 accesses data storage locations on a disc 105 (storage medium). The speaker vibration modeling circuit 114 is used to mitigate the effect of speaker vibration on the magnetoresistive transducer 106 as follows. To position the transducer 106 over the target data storage location in the storage medium 105, the transducer 106 first transmits its current position over the storage medium 105 to the feedback circuit 112, which compares the current position to a desired transducer position and drives an output signal (position error signal) to reposition the transducer 106. Such a desired transducer position may, for example, be associated with an access (read/write) command from a device the hard disc drive 104 services. The speaker vibration modeling circuit 114 receives an audio input associated with an audio speaker mechanically coupled to the disc drive or nearby. The speaker vibration modeling circuit 114 outputs a feedforward signal that, when summed with the position error signal (the modified position error signal), mitigates the effect of speaker-induced vibrations on the magnetoresistive transducer. The transducer 106 is thus positioned based on both the output signal and the feedforward signal, allowing the transducer to be positioned in a manner to that accommodates speaker induced vibrations.

The magnetoresistive transducer 106 and its supporting structure (effectively shown in FIG. 1) are susceptible to a variety of types of mechanical vibrations, which one or more embodiments are directed to addressing. One source of such vibrations is audio speakers which are commonly mounted to disc drives via a common chassis (e.g., laptop computers and tower computers). When music (or other sound) is being played through the audio speakers, vibration is transferred both through the air, as well as through vibrations induced in the chassis, via the audio speaker mounts, to the disc drive. When accessing data storage locations, the transducer, with a high degree of precision, follows a track on the storage medium 105 to which data is accessed in a sequential pattern along the track. In many disk drives, the number of tracks per inch has exceeded 300,000. As a result, even minor vibrations can cause the transducer 106 to deviate from track-center, or in the case of larger amplitude vibrations, reposition the transducer 106 completely over another track of the storage medium. Such vibrations can greatly impact read performance of a disc drive. For example, cross-track interference, due to an off-center position of the transducer, can deteriorate the read signal beyond the correction ability of error code correction. Accordingly, the disc drive would need to execute a reread of the data track to access the requested data. In the case of write operations, larger amplitude vibrations can result in an off-track write. Off-track writes can result in irretrievable data loss on the adjacent track that is unintentionally written over. As such, various embodiments as described herein are directed to reducing or eliminating problems that may occur due to such vibration.

In one embodiment, the speaker vibration modeling circuit 114 uses a lookup table that provides a correlation between a sensed audio input frequency and a resulting effect on the transducer 106. Accordingly, upon receiving a given audio frequency associated with audio being played over an audio speaker, the speaker vibration modeling circuit 114 compares the audio frequency with known audio frequencies and their associated effects on the transducer 106. If the audio frequency is in the lookup table, the speaker vibration modeling circuit 114 outputs a position error signal that mitigates the effect of such vibration on the transducer. Where the audio frequency is not found in the lookup table, the speaker vibration modeling circuit 114 extrapolates the effect of the speaker induced vibration on the transducer 106 based on known audio input frequencies. In some embodiments, the lookup table is populated during the ordinary use of the disc drive. In such a case, the speaker vibration modeling circuit 114 archives audio input frequencies and the ensuing effects on the transducer 106 in the lookup table. In another embodiment, the hard disc drive 104 is tested during manufacturing, and is cycled through a range of audio speaker induced vibrations to populate the lookup table. In yet another embodiment, the speaker vibration modeling circuit 114 can be preloaded with a generic lookup table containing test data associated with a generic speaker/hard drive laptop set-up. A combination of the above embodiments is also considered.

The magnetoresistive transducer 106 and its supporting structure is susceptible to mechanical vibrations. One source of such vibrations is audio speakers which are commonly mounted to disc drives via a common chassis (e.g., laptop computers and tower computers). When music is played through the audio speakers, vibration is transferred both through the air, as well as through vibrations induced in the chassis, via the audio speaker mounts, to the disc drive. When accessing data storage locations, the transducer 106, with a high degree of precision, follows a track on the storage medium 105 to which data is accessed in a sequential pattern along the track. In many disk drives, the number of tracks per inch has exceeded 300,000. As a result, even minor vibrations can cause the transducer 106 to deviate from track-center, or in the case of larger amplitude vibrations, reposition the transducer 106 completely over another track of the storage medium. Such vibrations can greatly impact read performance of a disc drive. For example, cross-track interference, due to an off-center position of the transducer, can deteriorate the read signal beyond the correction ability of error code correction. Accordingly, the disc drive would need to execute a reread of the data track to access the requested data. In the case of write operations, larger amplitude vibrations can result in an off-track write. Off-track writes can cause irretrievable data loss on the adjacent track that is unintentionally written over.

Figure 2:
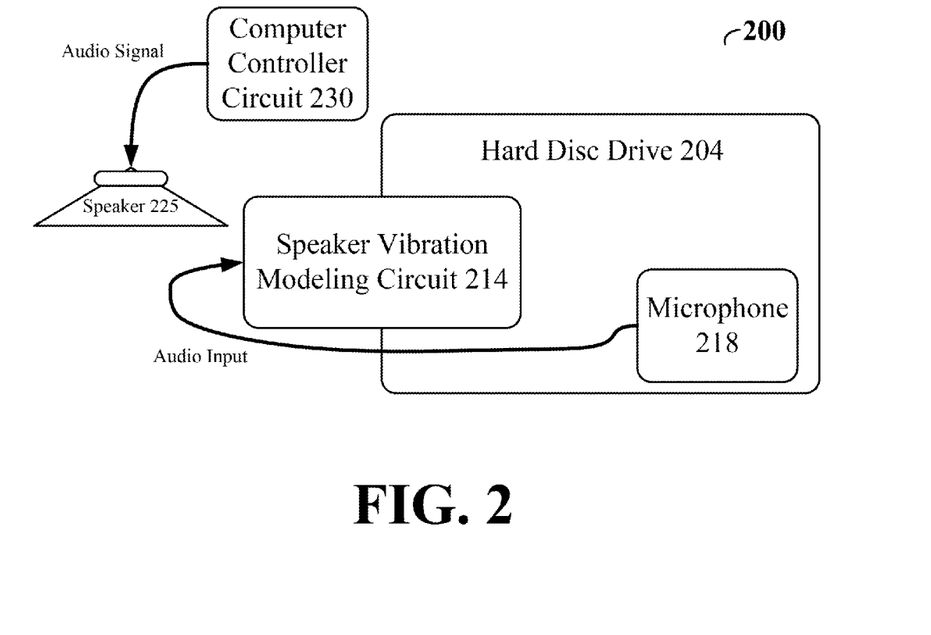
FIG. 2 is a block diagram of a disc drive environment consistent with various aspects of the present disclosure.

FIG. 2 is a block diagram of a computer system 200 that illustrates a speaker vibration mitigation scheme, consistent with various aspects of the present disclosure. In the present embodiment, the audio signal from a computer controller circuit 230 of the computer system 200 is indirectly fed into the speaker vibration modeling circuit 214. The computer controller circuit 230 generates an (analog) audio signal and transmits the signal to an audio speaker 225. The audio speaker 225 can be mechanically coupled to the hard disc drive 204 through a computer chassis (not shown) of the computer system 200. In an alternative embodiment, the speaker 225 is external to the computer system 200 but close enough in proximity as to allow the emanating sound waves to mechanically vibrate the computer chassis and hard disc drive 204. As shown in FIG. 2, the hard disc drive 204 includes a microphone 218 communicatively coupled to a speaker vibration modeling circuit 214. The microphone 218 receives the sound waves transmitted by the speaker 225 and transmits an audio input to the speaker vibration modeling circuit 214 consistent with the received sound waves. In some implementations, such an embodiment is used to mitigate the effect of speaker vibrations not associated with the computer system 200, but generally in the vicinity of the computer system 200. The speaker vibration modeling circuit 214 then generates an output signal indicative of modeled speaker vibration corresponding to the audio input (e.g., using one or more approaches as described above). The output signal is then summed with the position error signal and thereby mitigates effects of speaker-induced vibrations on the magnetoresistive transducer.

Figure 3:
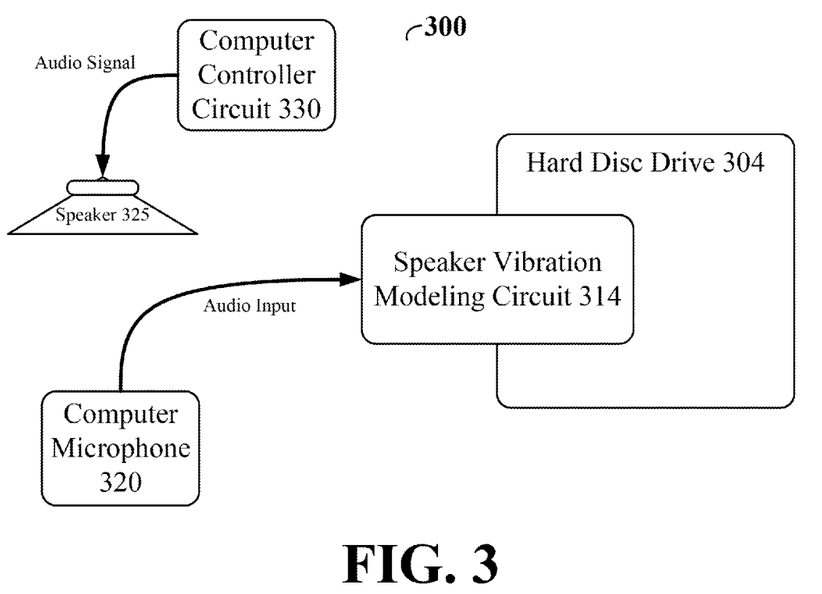
FIG. 3 is a block diagram of a disc drive environment consistent with various aspects of the present disclosure.

FIG. 3 is a block diagram of a computer system 300 that illustrates a speaker vibration mitigation scheme, consistent with various aspects of the present disclosure. In such an embodiment, a computer microphone 320 (e.g., as commonly found on many consumer laptops) is used to detect sound and/or mechanical vibrations. A computer controller circuit 330 of the computer system 300 generates an (analog) audio signal and transmits the signal to an audio speaker 325. The audio speaker 325 can be mechanically coupled to the hard disc drive 304 through a computer chassis (not shown) of the computer system 300. In some embodiments, the speaker 325 is external to the computer system 300, but close enough in proximity as to allow the emanating sound waves to mechanically vibrate the computer chassis and hard disc drive 304. The computer microphone 320 receives the sound waves transmitted by the speaker 325 and transmits an audio input to the speaker vibration modeling circuit 314 consistent with the received sound waves. The speaker vibration modeling circuit 314 then generates an output signal indicative of modeled speaker vibration corresponding to the audio input (e.g., using one or more approaches as described above). The output signal is then summed with the position error signal and thereby mitigates effects of speaker-induced vibrations on the magnetoresistive transducer.

A variety of connectors may be implemented for communicating signals as described herein, such as with an enhanced hard disc drive connector as discussed above. In some embodiments, the enhanced hard disc drive connector uses Serial Attached SCSI (SAS) or Serial Advanced Technology Attachment (SATA) interfaces to communicatively couple hard disc drive 304 to computer system 300 and provide an audio input direct from the computer system 300. In other embodiments, a separate connector is implemented in parallel with a SAS/SATA interface connector. Referring to FIG. 3 by way of example, such a connector may communicatively couple the hard disc drive 304 and the computer system 300 for both data access requests/responses, as well as to provide a speaker vibration modeling circuit with an audio input direct from the computer system. In such embodiments, the audio input signal is provided to the speaker vibration modeling circuit 314 prior to the speaker producing the vibration and before disc drive performance is affected by such speaker-induced vibrations, and used to preemptively prepare the transducer and its positioning system for the vibration. Such an enhanced hard disc drive connector can be utilized in several of the present embodiments.

In one specific embodiment, spare ground pins and power pins of an enhanced SAS/SATA disc drive interface connector (such as a 5 volt power pin) communicates audio signals to the disc drive, and allows for backwards compatibility with older computers and disc drives. In such an implementation, high impedance resistors (e.g., 10 k Ohms) are placed on both audio signal lines on either side of the enhanced connector. If the computer is not wired for speaker vibration mitigation, the disc drive will see a 0 input and will disable the speaker vibration mitigation feedforward signal. If the computer is wired for speaker vibration mitigation, but the disc drive is not capable, the loading on the speaker system is very small and will not affect sound quality. If both the computer and disc drive are configured for speaker vibration mitigation, the signal is used to improve disc drive performance.

Figure 4:
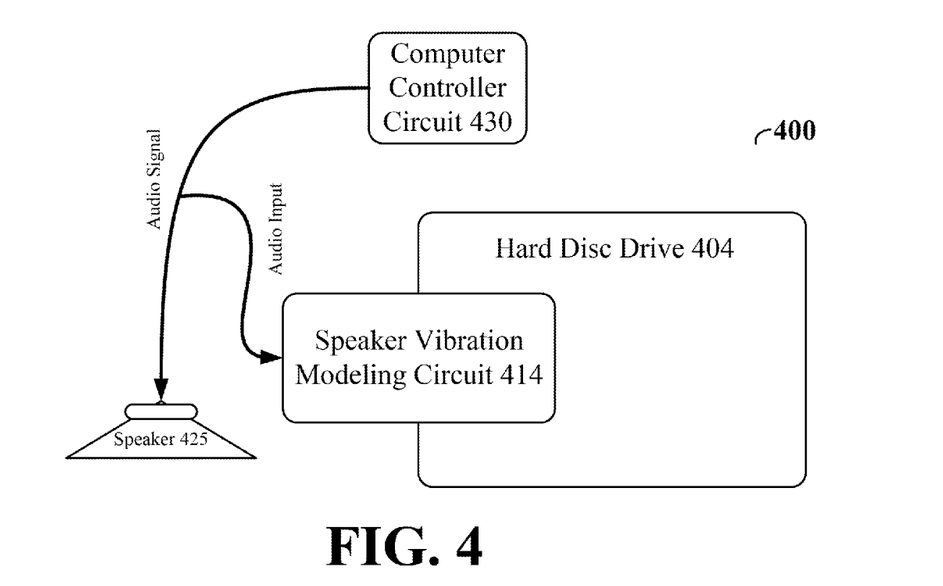
FIG. 4 is a block diagram of a disc drive environment consistent with various aspects of the present disclosure.

FIG. 4 is a block diagram of a computer system 400 including a hard disc drive 404 that employs a speaker vibration mitigation scheme, consistent with various aspects of the present disclosure. An audio signal emanating from a computer controller circuit 430 is split off from an analog audio signal transmitted to the speaker 425, and also received by a speaker vibration modeling circuit 414. The speaker vibration modeling circuit 414 generates an output signal indicative of modeled speaker vibration corresponding to the audio input (e.g., using one or more approaches as described above). The output signal is summed with a position error signal and thereby mitigates effects of speaker-induced vibrations on the magnetoresistive transducer.

Figure 5:
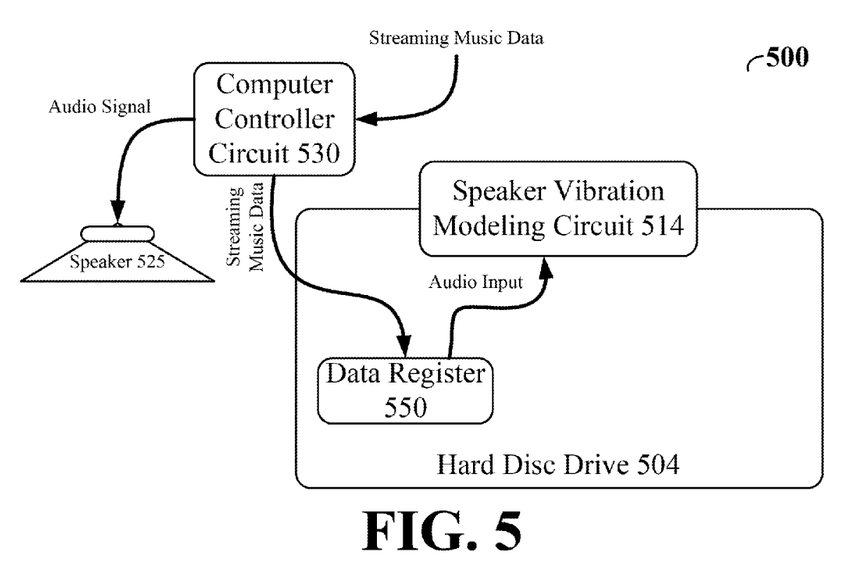
FIG. 5 is a block diagram of a disc drive environment consistent with various aspects of the present disclosure.

FIG. 5 is a block diagram of a computer system 500 that employs a speaker vibration mitigation scheme for an audio signal source involving streaming music such as internet-based streaming music, consistent with various aspects of the present disclosure. Streaming music data is received in the form of data packets by a computer controller circuit 530, and the streaming music data is converted into an analog audio signal and transmitted to the speaker 525. As the computer controller circuit 530 receives the streaming music data packets, the computer controller circuit 530 relays the streaming music data packets to the hard disc drive 504. The music data packets are written to a data register 550 associated with the speaker vibration modeling circuit 514, wherein the data is forwarded on demand to the speaker vibration modeling circuit 514. The speaker vibration modeling circuit 514 generates an output signal indicative of modeled speaker vibration corresponding to the audio input (e.g., using one or more approaches as described above). The output signal is then summed with the position error signal and thereby mitigates effects of speaker-induced vibrations on the magnetoresistive transducer.

Figure 6:
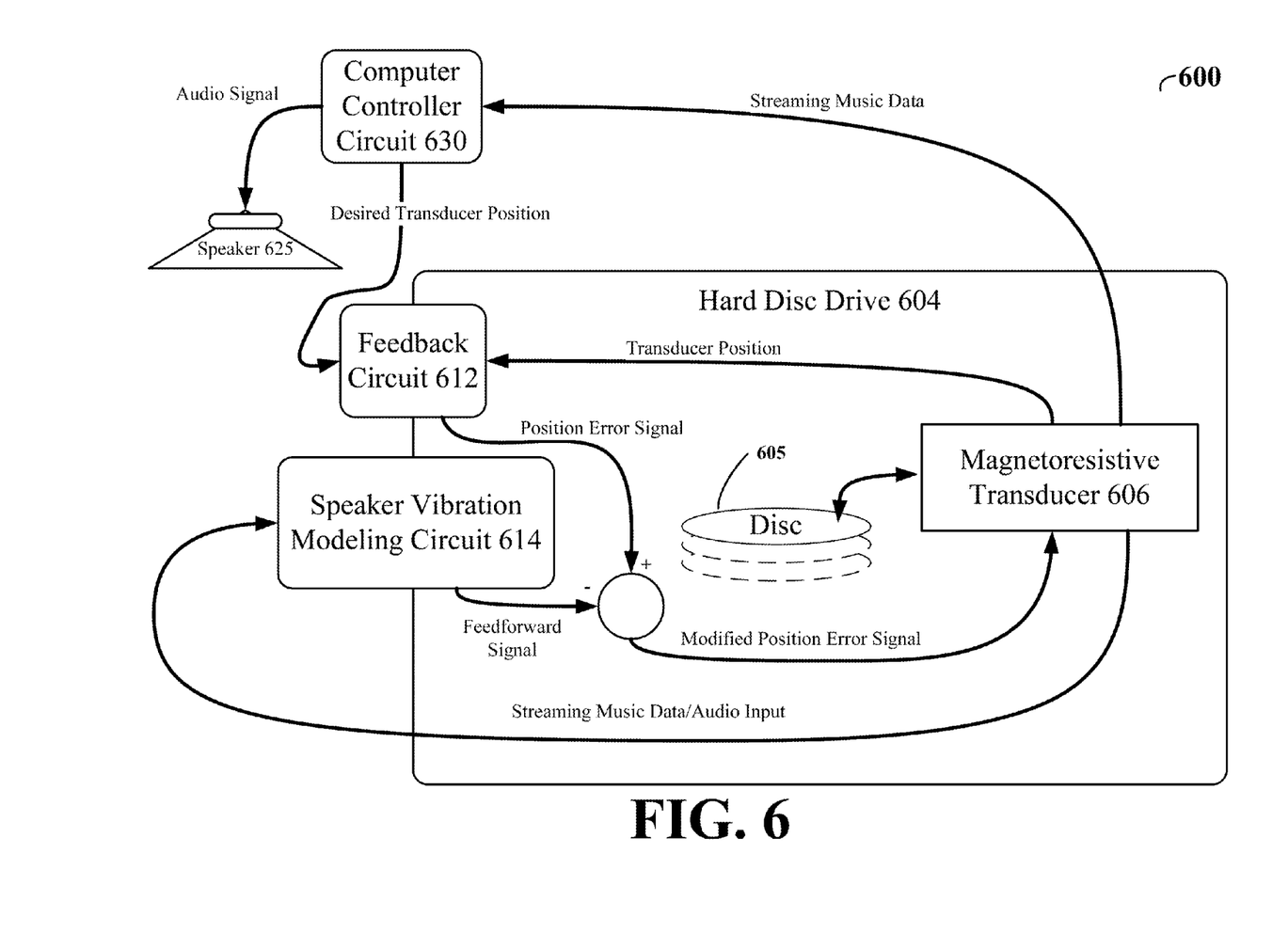
FIG. 6 is a block diagram of a disc drive environment consistent with various aspects of the present disclosure.

FIG. 6 is a block diagram of a computer system 600 that employs a speaker vibration mitigation scheme, consistent with various aspects of the present disclosure. Audio data being played over the speaker 625 originates from data stored on a disc 605 and accessed via a magnetoresistive transducer 606 (within hard disc drive 604). Hard disc drive 604 identifies the data being accessed by the computer controller circuit 630 as music data and transmits the same data directly to the speaker vibration modeling circuit 614. The speaker vibration modeling circuit receives the audio input prior to the audio being processed by the computer controller circuit 630 and used to output sound via speaker 625. The speaker vibration modeling circuit 614 then generates an output signal indicative of modeled speaker vibration corresponding to the audio input (e.g., using one or more approaches as described above). The output signal is then summed with the position error signal generated by Feedback Circuit 612 and thereby mitigates effects on the magnetoresistive transducer 606 associated with speaker-induced vibrations.

Various modules or other circuits may be implemented to carry out one or more of the operations and activities described herein and/or shown in the figures. In these contexts, a "module" is a circuit that carries out one or more of these or related operations/activities (e.g., speaker vibration modeling circuit, feedback circuit, or computer controller circuit). For example, in certain of the above-discussed embodiments, one or more modules are discrete logic circuits or programmable logic circuits configured and arranged for implementing these operations/activities, as in the circuit modules shown in FIGS. 1-6. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the present invention without strictly following the exemplary embodiments and applications illustrated and described herein. For example, the circuits disclosed herein can be implemented either on-board the disc drive or as remote circuits that control a disc drive without processing circuitry. Such modifications do not depart from the true spirit and scope of the present invention, including that set forth in the following claims.

What is claimed is:
1. An apparatus comprising:
    a hard disc drive having
        a storage medium, and
        a magnetoresistive transducer configured and arranged to access data storage locations on the storage medium;
    a speaker vibration modeling circuit configured and arranged to detect audio generated by an audio speaker via a microphone, and to generate an output signal indicative of modeled speaker vibration of the speaker corresponding to the detected audio; and
    a feedback circuit configured and arranged to position the magnetoresistive transducer relative to the storage medium based upon
        a target one of the data storage locations in the storage medium,
        the position of the magnetoresistive transducer, and
        the modeled speaker vibration indicated via the output signal.

2. The apparatus of claim 1, wherein
    the hard disc drive is coupled to a computer including the audio speaker which vibrates the hard disc drive when in operation, and
    the speaker vibration modeling circuit is configured and arranged with the feedback circuit to mitigate effects of speaker-induced vibrations on the magnetoresistive transducer by
        detecting audible sound generated by the audio speaker via the microphone,
        modeling vibration of the audio speaker that generates the detected audible sound, and
        positioning the magnetoresistive transducer in a manner that counteracts vibration of the audio speaker based on the modeled vibration, therein mitigating data read errors that may be incurred via the magnetoresistive transducer due to the vibration.

3. The apparatus of claim 1, wherein the speaker vibration modeling circuit is configured and arranged to detect the audio by further detecting an electronic audio signal including audio playback data for generating sound via a speaker for which the speaker vibration is modeled.

4. The apparatus of claim 1, wherein the apparatus includes the audio speaker that generates the audio detected by the microphone, and the speaker vibration modeling circuit is configured and arranged to detect audio by detecting sound waves generated by the audio speaker.

5. The apparatus of claim 1, wherein the output signal of the speaker vibration modeling circuit is based upon an expected effect of a speaker's vibration on the transducer.

6. The apparatus of claim 1, wherein the output signal of the speaker vibration modeling circuit is based on a lookup table containing audio inputs and corresponding output signals to mitigate effects of speaker vibration on the magnetoresistive transducer associated with the audio input.

7. The apparatus of claim 1, wherein the speaker vibration modeling circuit is configured and arranged to detect the audio by further detecting an analog audio signal, and the speaker vibration modeling circuit is further configured and arranged to mitigate effects of speaker-induced vibrations on the magnetoresistive transducer based upon the analog audio signal.

8. The apparatus of claim 1, wherein the apparatus further includes an enhanced hard disc drive connector that is configured and arranged to communicate data to and from the hard disc drive, and to receive and communicate the audio to the speaker vibration modeling circuit.

9. The apparatus of claim 1, wherein the speaker vibration modeling circuit is configured and arranged to detect the audio by further detecting a digital audio signal, and the speaker vibration modeling circuit is further configured and arranged to mitigate effects of speaker-induced vibrations on the magnetoresistive transducer based upon the digital audio signal.

10. The apparatus of claim 1, wherein an analog audio signal is provided to the speaker vibration modeling circuit via the microphone, the microphone is directly coupled to the hard disc drive, and the speaker vibration modeling circuit is configured and arranged to detect and use the analog audio signal produced by the microphone to mitigate effects of speaker-induced vibrations on the magnetoresistive transducer.

11. The apparatus of claim 1, further including the microphone, wherein the speaker vibration modeling circuit is configured and arranged to detect the audio by detecting an analog audio signal via the microphone, the microphone being mechanically coupled to a computer containing the hard disc drive, and the microphone is communicatively coupled to the hard disc drive.

12. The apparatus of claim 1, wherein the speaker vibration modeling circuit is configured and arranged to
    generate the output signal as a feedforward signal for positioning the magnetoresistive transducer of the hard disc drive, based on an expected effect of speaker vibration upon the magnetoresistive transducer,
    sum the feedforward signal with a position error signal indicative of a position of the magnetoresistive transducer, and
    provide an output that cancels the effect of the modeled speaker vibration upon the position of the magnetoresistive transducer relative to the storage medium.

13. A method comprising:
    detecting audio, including detecting sound with a microphone;
    generating an output signal indicative of modeled speaker vibration corresponding to the detected audio; and
    positioning a magnetoresistive transducer of a hard disc drive relative to a storage medium based upon
        a target data storage location in the storage medium,
        the position of the magnetoresistive transducer, and
        the modeled speaker vibration indicated via the output signal.

14. The method of claim 13, wherein the step of positioning the magnetoresistive transducer further includes:
    providing a feedforward signal to cancel speaker vibrations by
        receiving an audio signal associated with an output of an audio speaker, and
        generating the feedforward signal indicative of modeled speaker vibration corresponding to the received audio signal;
    summing the feedforward signal into a position error signal for an actuator that positions the magnetoresistive transducer; and
    providing an amplified version of the position error signal including the summed feedforward signal to the actuator, thereby inducing a force applied to the actuator such that the force holds the magnetoresistive transducer at a target track center position while vibrations, associated with the audio speaker, occur during hard disc drive operations.

15. The method of claim 14, wherein the step of generating the feedforward signal further includes associating the received audio signal with a corresponding vibration sensed at a transducer of the hard disc drive, via a lookup table, and generating a feedforward signal that mitigates off-track effects of such vibration on the transducer.

16. The method of claim 14, wherein the audio signal originates from the group consisting of a digital speaker signal, an analog speaker signal, an analog microphone signal, and combinations thereof.

17. The method of claim 14, wherein the feedforward signal is of an inverse amplitude of vibration associated with the audio signal, and the position error signal applied to the actuator provides an equal and opposite force to the vibrations.

18. The method of claim 13, wherein the step of positioning the magnetoresistive transducer further includes:
    providing a position error signal that is based on a position error of the magnetoresistive transducer relative to a surface of the disc drive;
    generating a feedforward signal by
        sensing, via a speaker vibration modeling circuit and the microphone, an audio input of an audio speaker coupled to the disc drive,
        associating the sensed audio input with a corresponding speaker vibration, and
        determining a feedforward signal to cancel effects of speaker vibration on the transducer; and
    reducing effects of the speaker vibration on the position error signal by adaptively summing the position error signal with the feedforward signal, and using the sum to position the magnetoresistive transducer.

19. The method of claim 18,
    further including
        learning the effect of the speaker vibration on the disc drive for a plurality of audio inputs, and
        storing, in a lookup table on the disc drive, the learned effects of the speaker vibration in association with the respective audio inputs;
    wherein the step of associating the sensed audio input with the corresponding speaker vibration includes retrieving from the lookup table one of the learned effects of the speaker vibration stored in association with an audio input that corresponds to the sensed audio input; and
    the step of determining the feedforward signal includes generating the feedforward signal with a frequency that is phase-offset from the speaker vibration and an amplitude that inversely corresponds to the retrieved learned effects of the speaker vibration.

20. The method of claim 18, wherein the audio input is one of the group consisting of a digital speaker signal, an analog speaker signal, an analog microphone signal, and combinations thereof.

* * * * *